United States Patent
Jameson et al.

(10) Patent No.: US 10,857,906 B2
(45) Date of Patent: Dec. 8, 2020

(54) VEHICLE SEAT RISER

(71) Applicant: Tesla, Inc., Palo Alto, CA (US)

(72) Inventors: Aaron Pitr Jameson, Clovis, CA (US); Reid M. Olsen, San Francisco, CA (US); David Eduardo Banales Cano, San Jose, CA (US); Nathan Paul Di Giusto, San Ramon, CA (US); Sekhar Reddy Biddala Reddy, Pleasanton, CA (US)

(73) Assignee: Tesla, Inc., Palo Alto, CA (US)

( * ) Notice: Subject to any disclaimer, the term of this patent is extended or adjusted under 35 U.S.C. 154(b) by 0 days.

(21) Appl. No.: 15/808,785

(22) Filed: Nov. 9, 2017

(65) Prior Publication Data

US 2019/0135137 A1      May 9, 2019

(51) Int. Cl.
    *B60N 2/015*       (2006.01)
(52) U.S. Cl.
    CPC .................... *B60N 2/015* (2013.01)
(58) Field of Classification Search
    CPC .............. B60N 2/015; B29C 45/14065; B29C 45/14819; B29L 2031/3076
    USPC ...................... 248/188, 188.1, 188.8, 188.91; 297/452.1, 452.18, 411.2, 411.3, 411.34, 297/411.35, 411.36, 411.46
    See application file for complete search history.

(56) References Cited

U.S. PATENT DOCUMENTS

| | | | | |
|---|---|---|---|---|
| 2,933,127 A | * | 4/1960 | Brewster | B64D 11/064 297/216.2 |
| 3,603,638 A | * | 9/1971 | McGregor | B64D 11/06 297/216.2 |
| 4,911,381 A | * | 3/1990 | Cannon | B64D 11/0696 244/122 R |
| 5,531,404 A | * | 7/1996 | Marechal | B64D 25/04 244/118.6 |
| 5,657,950 A | * | 8/1997 | Han | B64D 11/06 244/122 R |
| 6,565,151 B2 | * | 5/2003 | Jarnail | B60N 2/42736 297/216.16 |
| 8,801,101 B2 | * | 8/2014 | Dagcioglu | B60N 2/3022 297/331 |
| 2005/0139297 A1 | * | 6/2005 | Shin | C22F 1/06 148/557 |
| 2006/0138844 A1 | * | 6/2006 | LaVoie | B60N 2/01583 297/378.12 |
| 2007/0246985 A1 | * | 10/2007 | Sahi | B60N 2/123 297/331 |
| 2012/0139302 A1 | * | 6/2012 | Estevenin | B64D 11/0638 297/162 |
| 2015/0204040 A1 | * | 7/2015 | Knezevich | E06B 9/02 405/114 |
| 2017/0113803 A1 | * | 4/2017 | Maslakow | B29C 45/1657 |

* cited by examiner

*Primary Examiner* — Muhammad Ijaz
(74) *Attorney, Agent, or Firm* — Knobbe, Martens, Olson & Bear, LLP

(57) ABSTRACT

A riser for a seat of a vehicle includes a first leg, a second leg, a first arm, a second arm, and a third arm. The first leg includes a first end and a second end. The second leg is substantially parallel to the first leg and has a first end and a second end. The third arm includes a first end and a second end, where the second end of the third arm extends from the first end of the second leg. The first arm extends from the first end of the first leg to the first end of the third arm. The second arm extends from the second end of the first leg to the first end of the third arm.

17 Claims, 12 Drawing Sheets

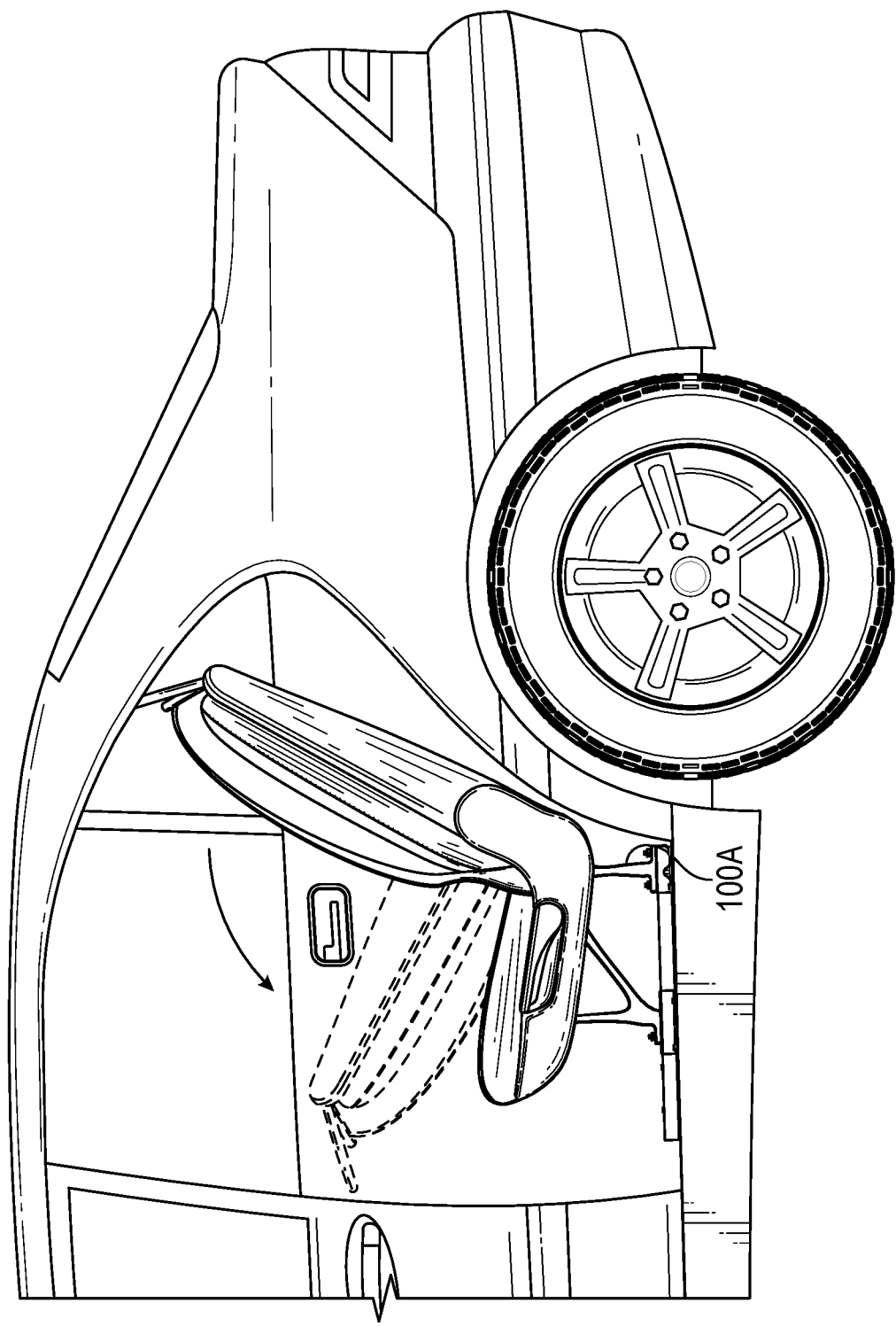

VEHICLE SEAT RISER

BACKGROUND

Technical Field

The present disclosure relates to a riser for a seat of a vehicle. More particularly, the present disclosure relates to a riser that connects the seat to the frame of the vehicle.

Description of Related Art

Passenger vehicles such as cars, trucks, or the like typically include front and/or rear seats upon which the passengers can sit. The seats are either directly or indirectly mounted to the frame of the vehicle. Vehicles also include seat belts to secure and protect seated passengers in the event of a collision.

SUMMARY

A riser for a seat of a vehicle includes a first leg, a second leg, a first arm, a second arm, and a third arm. The first leg includes a first end and a second end. The second leg is substantially parallel to the first leg and includes a first end and a second end. The third arm includes a first end and a second end, where the second end of the third arm extends from the first end of the second leg. The first arm extends from the first end of the first leg to the first end of the third arm. The second arm extends from the second end of the first leg to the first end of the third arm.

BRIEF DESCRIPTION OF THE DRAWINGS

FIG. 3 illustrates two risers attached to a seat and vehicle frame according to some embodiments.

Figure 1A:
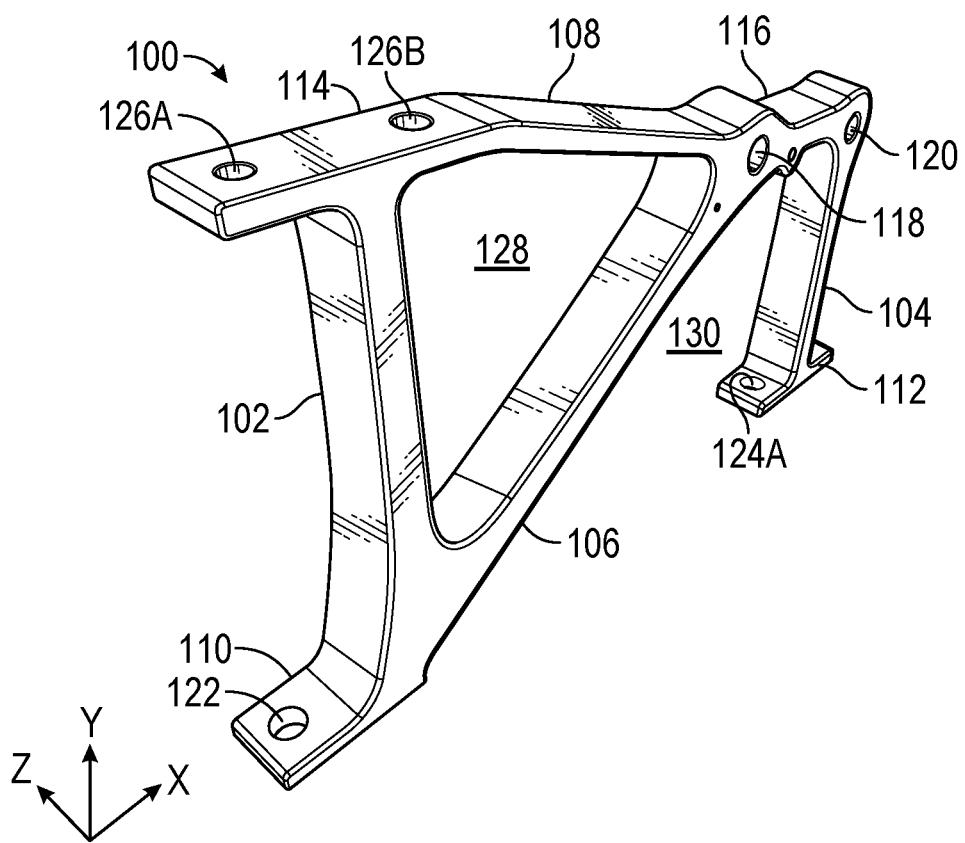
FIG. 1A illustrates a top, front, right perspective view of a riser for a vehicle seat according to some embodiments.
Figure 1B:
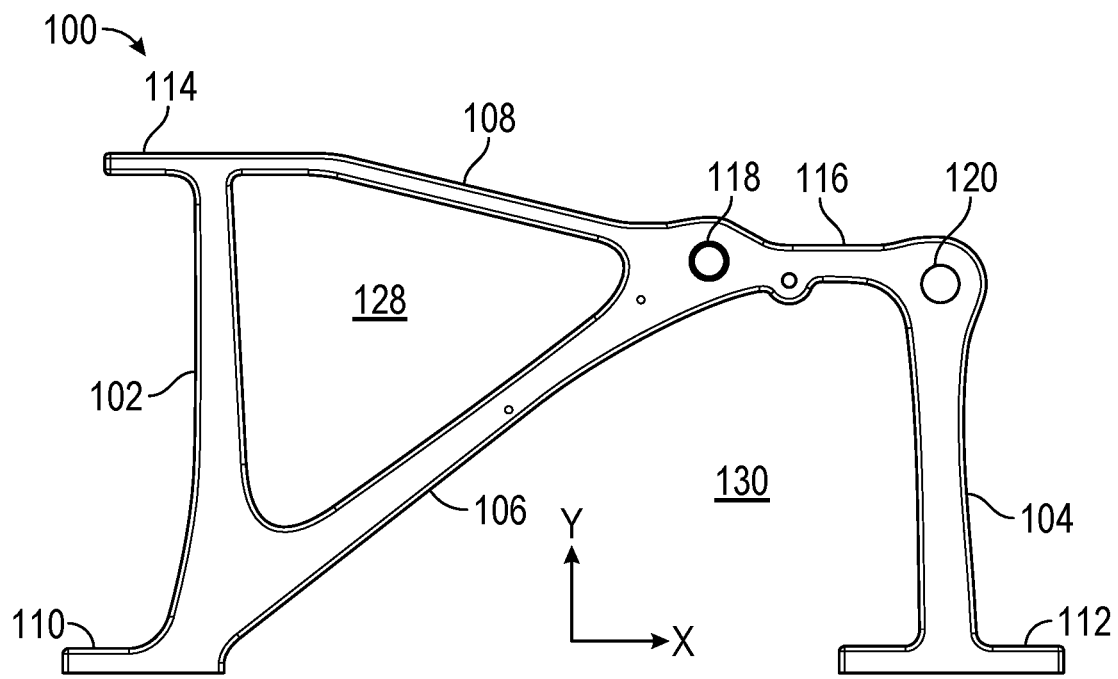
FIG. 1B illustrates right side view of the riser.
Figure 1C:
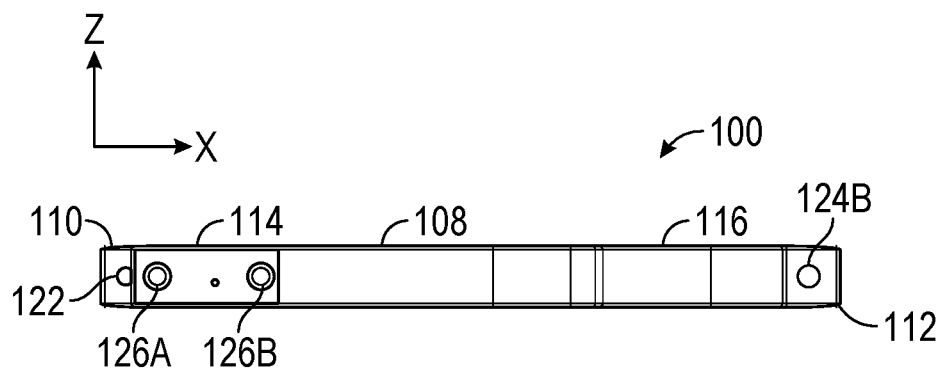
FIG. 1C illustrates a top view of the riser.
Figure 1D:
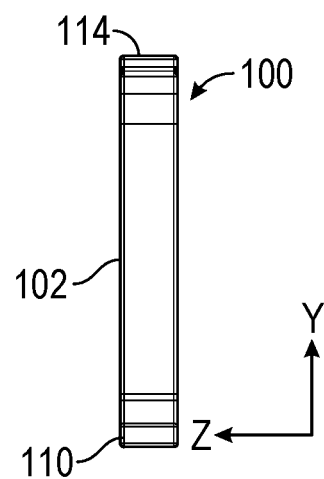
FIG. 1D illustrates a front view of the riser.
Figure 1E:
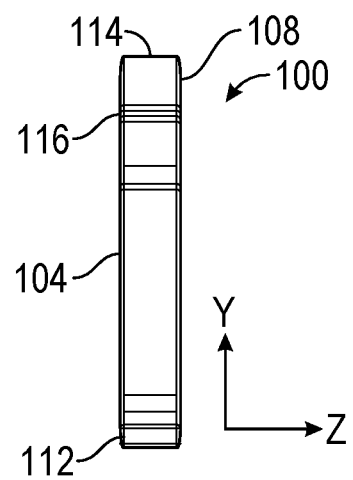
FIG. 1E illustrates a rear view of the riser.
Figure 1F:
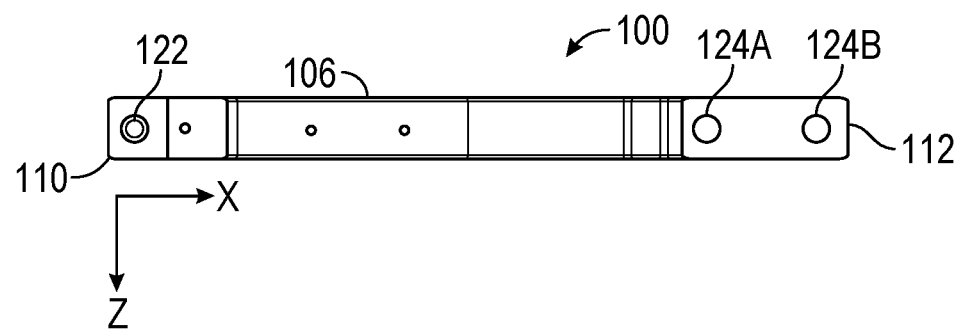
FIG. 1F illustrates a bottom view of the riser.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION OF THE DISCLOSURE

The present disclosure provides examples of systems and techniques for providing a structure (e.g., a riser) to carry the frame of a seat in a vehicle. The structure provides a mass efficient way of supporting a seat from the vehicle floor in an elegant and structurally sound way, while permitting the use of forward/aft adjustment mechanism (e.g., a track system) for movement and/or a mechanism for adjusting the seat back to lay flat against the bottom cushion of the seat. The structure also has manufacturing advantages in terms of the process and materials that can be used. The structure effectively distributes a load (e.g., during a collision) from a seat belt to the interior floor of a vehicle. It has a small lateral profile that does not occupy a significant amount of floor space underneath the seat. The structure also allows for a single piece construction that can be directly finished to prevent corrosion and create a smooth finish without the need for separate decorative coverings.

Reference will now be made in detail to specific aspects or features, examples of which are illustrated in the accompanying drawings. Like reference numerals refer to corresponding parts throughout the figures.

FIGS. 1A-1F illustrate a riser 100 in accordance with some embodiments. A rectilinear XYZ coordinate frame is defined in FIGS. 1A-1F for the purpose of describing the relationship between the various portions of riser 100. The positive x-direction is referred to as the rearward direction, the positive y-direction is referred to as the upward direction, and the positive z-direction is referred to as the leftward direction. For example, in FIG. 1B, the front of riser 100 is on the left, and the rear of riser 100 is on the right. Accordingly, FIGS. 1A-1F illustrate a perspective view, right side view, top view, front view, rear view, and bottom view of riser 100, respectively. In some embodiments, the left side view is a mirror image of the right side view illustrated in FIG. 1B.

Figure 2A:
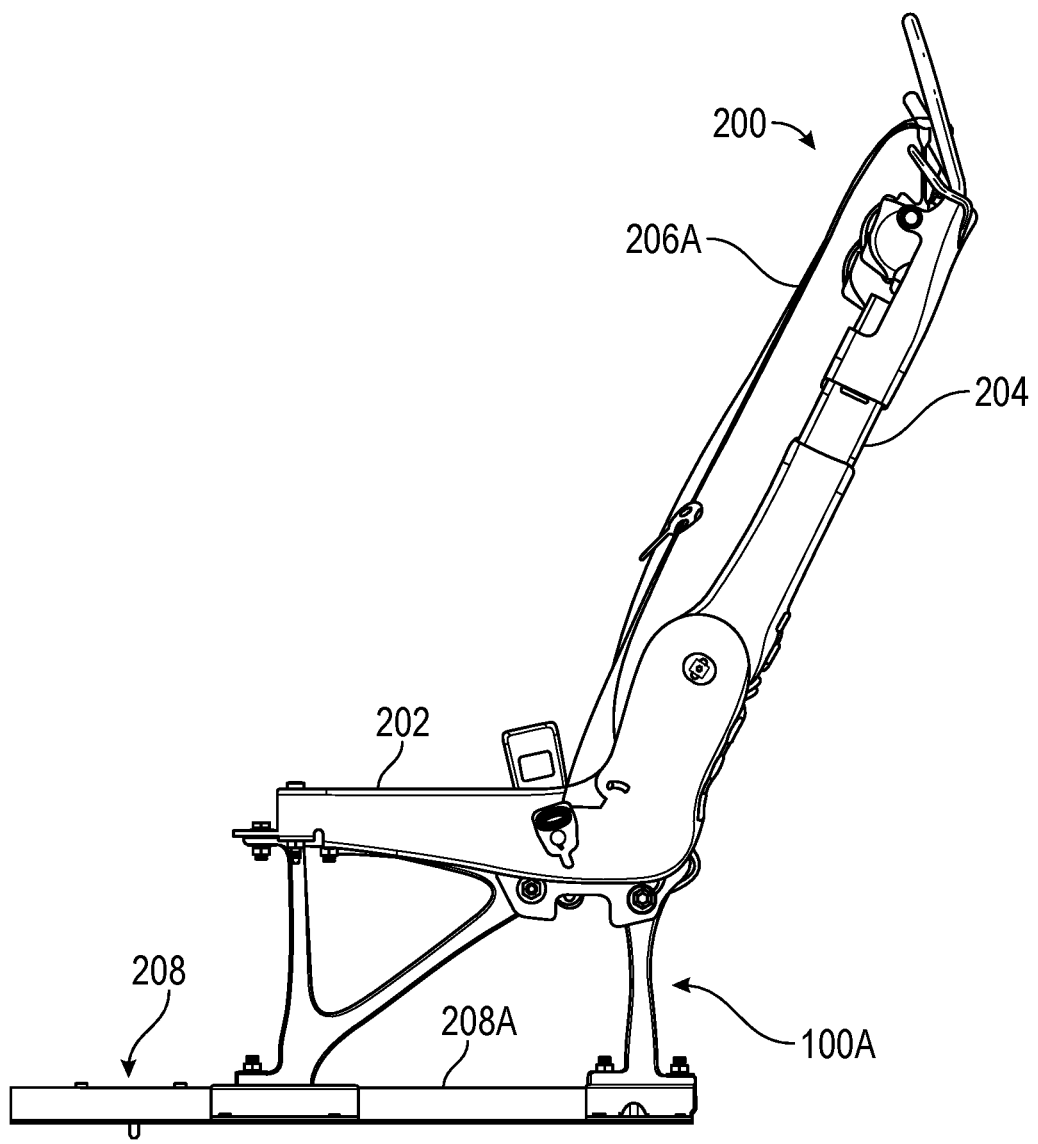
FIGS. 2A-2B illustrate two risers attached to a seat and vehicle frame according to some embodiments.
Figure 2B:
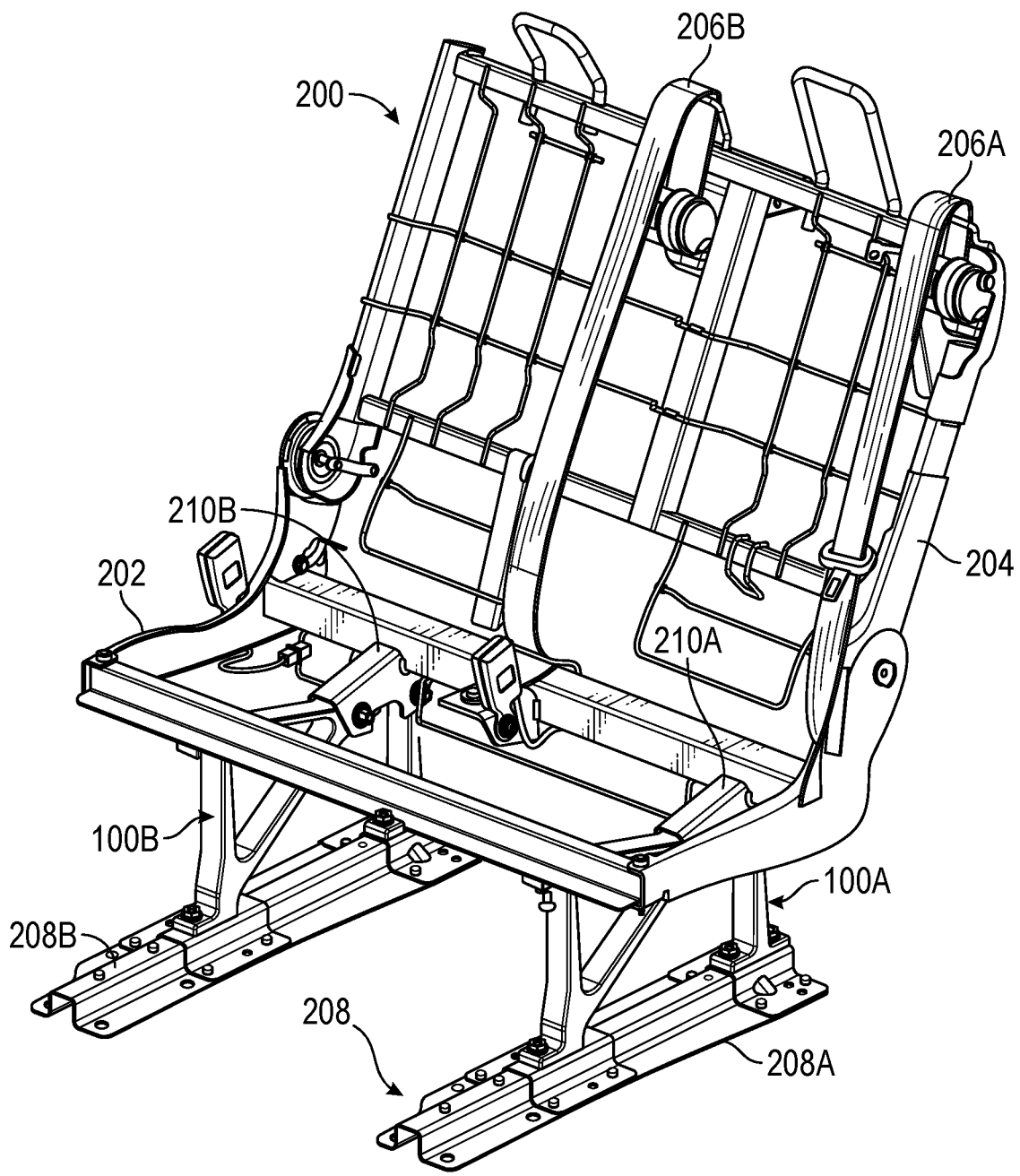

Riser 100 is illustrated in isolation in FIGS. 1A-1F. FIGS. 2A-2B illustrate an example of how riser 100 can be used to connect a vehicle seat structure 200 to a vehicle frame 208. The seat structure 200 includes a cushion frame 202 and a back frame 204. The seat structure 200 provides anchor points for seat belts 206A and 206B mounted on the seat. That is, the seat belts can be contained entirely on the seat so that the seat belts are not affected by fore/aft movement or folding of the seat. Here, an upper anchor point is provided on the back frame 204. Optionally, other seat belt anchor points are provided on the seat structure 200 (e.g., seat belt anchor points may be provided on cushion frame 202). As described in greater detail below, riser 100 can transfer loads from the seat and/or seat belts above, which enables the seat to be free standing (e.g., to have the seat belt(s) anchored solely on the seat structure 200 and not directly to any part of the vehicle frame). The riser can be subjected to significant loads, especially when the seat is occupied and the vehicle experiences strong forces, such as during a collision. Part or all of the riser can therefore be made of material(s) having significant yield and/or tensile strength, including, but not limited to, aluminum alloy. Techniques for attaching riser 100 to seat structure 200 and vehicle frame 208 are described in greater detail below along with exemplary loading scenarios. Although the embodiments below describe use of riser 100 with a free standing seat, it should be recognized, that riser 100 can also be used to support a seat in embodiments in which the seat belt(s) are connected directly to the vehicle frame.

Returning to FIGS. 1A-1F, riser 100 includes the following portions: front leg 102, rear leg 104, lower arm 106, upper arm 108, front foot 110 (with through hole 122), rear foot 112 (with through holes 124A and 124B), front upper interface 114 (with through holes 126A and 126B), and rear arm 116 (with front interface through hole 118 and rear interface through hole 120). In some embodiments, riser 100 is a single piece of material, as opposed to a component with multiple, interconnected pieces or a single component that has been formed by welding or otherwise permanently connecting together multiple pieces. As will be described in greater detail below, riser 100 is optionally formed by extruding a material (e.g., aluminum alloy) and then cutting a section of the extrusion. When formed from aluminum alloy 6005A-T61, riser 100 has a mass of substantially 1.84 kg. In some examples, riser 100 has a mass between 1.7 kg and 2 kg. Although riser 100 is described herein as being formed by an extrusion process, in some embodiments, riser 100 is formed by other techniques such as forging or stamping.

Front leg 102 extends substantially vertically (e.g., approximately parallel to the y-axis) from front foot 110 to front upper interface 114. Rear leg 104 extends substantially vertically (e.g., approximately parallel to front leg 102) from rear foot 112 to the rear portion of rear arm 116.

Lower arm 106 extends diagonally upward and rearward (e.g., in the positive x-direction and positive y-direction) from front foot 110 to the front portion of rear arm 116. Upper arm 108 extends primarily rearward (e.g., in the positive x-direction) and, optionally, slightly downward (e.g., in the negative y-direction) from front upper interface 114 (e.g., from the top end of front leg 102) to the front end of rear arm 116 (e.g., to the rear end of lower arm 106). In some embodiments, the front leg 102, lower arm 106, and upper arm 108 are approximately the same length.

Front foot 110 is substantially perpendicular to front leg 102 and extends forward (e.g., in the negative x-direction) in front of front leg 102. Front foot 110 includes a through hole 122 with an axis parallel to the y-axis (hereinafter, a "vertical through hole") for bolting the bottom front of riser 100 to another component, such as an interior floor of a vehicle, a frame of a vehicle, or another component that interfaces (e.g., connects) with the frame of the vehicle (e.g., a bracket, track, or railing). Front foot 110 extends farther forward than front upper interface 114. When riser 100 is connected between a vehicle seat and the floor of a vehicle (e.g., as shown in FIGS. 2A-2B, discussed below), extending front foot 110 in front of front upper interface 118 helps riser 100 resist loads that pull the seat forward, as described in greater detail below with reference to FIG. 4. Rear foot 112 is substantially perpendicular to rear leg 104 and extends both forward and backward from the bottom of rear leg 104. Rear foot 112 includes a vertical through hole 124A in front of rear leg 104 and a vertical through hole 124B behind rear leg 104 for bolting the bottom rear of riser 100 to another component, such as the component(s) to which front foot 110 may be connected. Front foot 110 and rear foot 112 are substantially in a common plane that is parallel to the x-z plane (e.g., so that the bottoms of front foot 110 and rear foot 112 are flush against the surface of a frame of the vehicle). Optionally, the curvature of the transition from front foot 110 into the lower end of front leg 102 has a larger radius than the curvature of the transition from rear foot 112 into the bottom of rear leg 104 in order to account for the larger load applied to this portion of riser 100 during a load acting on the seat belts substantially in the negative x-direction (e.g., during a front impact), as compared to a load acting on the seat belts substantially in the positive x-direction (e.g., during a rear impact), which places greater stress on the transition between the rear portion of rear foot 112 and the lower end of rear leg 104.

Front upper interface 114 is substantially perpendicular to front leg 102 and extends both forward and backward (e.g., along the x-direction) from the top end of front leg 102. Front upper interface 114 includes a vertical through hole 126A in front of front leg 102 and a vertical through hole 126B behind front leg 102 for bolting the top front of riser 100 to a seat frame (e.g., the bottom of a seat frame underneath the seat). Rear arm 116 extends between the rear ends of lower arm 106 and upper arm 108 (e.g., where lower arm 106 and upper arm 108 converge) to the top of rear leg 104. Front interface through hole 118 and rear interface through hole 120 in rear arm 116 go through riser 100 and each have an axis parallel to the z-axis. In the illustrated embodiments, rear arm 116 is substantially perpendicular to rear leg 104 (e.g., substantially parallel to the x-axis) and front interface through hole 118 and rear interface through hole 120 are substantially the same distance in the y-direction from the bottom of riser 100 and provide an interface to which riser 100 can be bolted (e.g., with steel bolts) to a bracket (e.g., a steel bracket) or other interface connected to the bottom rear portion of the seat frame. In the illustrated embodiments, rear leg 104 is shorter than front leg 102, and rear arm 116 is lower than front upper interface 114.

Figure 4:
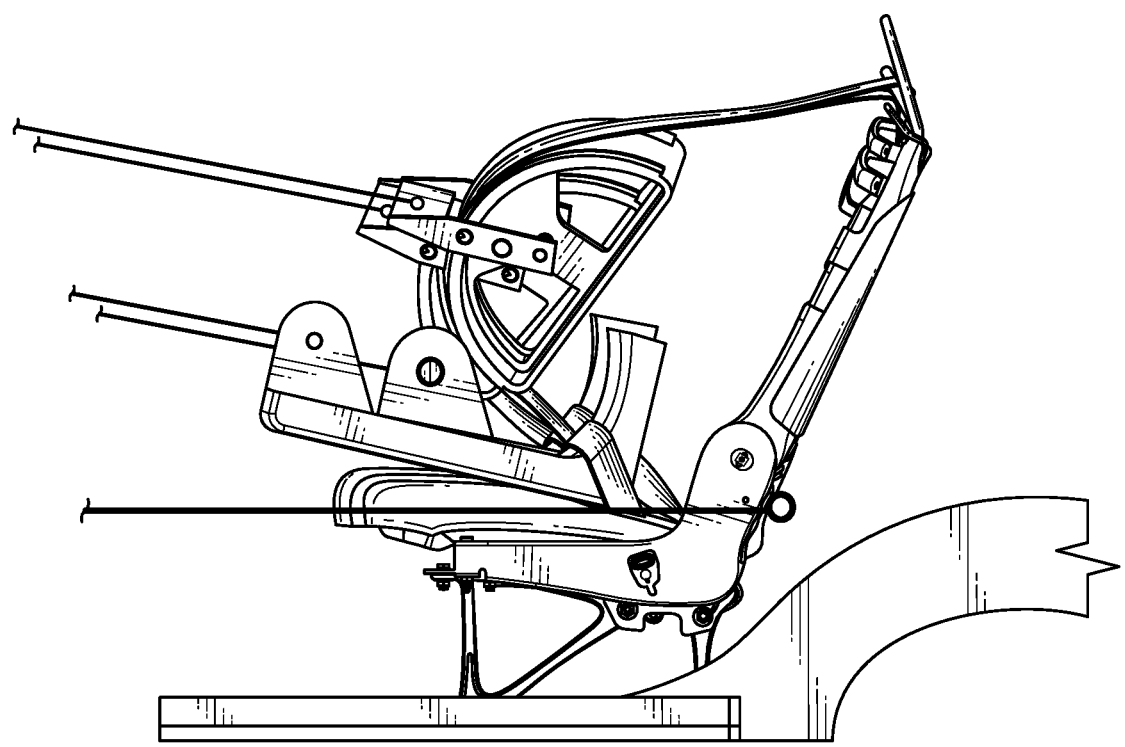
FIG. 4 illustrates a load applied to a seat supported by risers according to some embodiments.

During a load acting on the seat belts substantially in the negative x-direction (e.g., during a front impact) or the load described below with reference to FIG. 4, a greater upward force is placed on the rear portion of riser 100 than on front upper interface 114. Compared to vertical through holes 126A and 126B in front upper interface 114, the horizontal orientation of front interface through hole 118 and rear interface through hole 120 through riser 100 allow riser 100 to withstand the greater substantially upward force applied to the rear portion of riser 100 than to front upper interface 118. Positioning the front interface through hole 118 and rear interface through hole 120 at substantially the same height from the bottom of riser 100 more effectively transfers the moment created by a load on the seat and/or seat belts to the frame of the vehicle. Additionally, lower arm 106 extends in substantially a straight line between front foot 110 (where riser 100 interfaces with the floor of the vehicle under the front of the seat frame) and front upper interface through hole 118 (where riser 100 interfaces with the rear portion of the seat frame). Upper arm 108 extends in substantially a straight line between front upper interface 114 (where riser 100 interfaces with the front portion of the seat frame) and front upper interface through hole 118 (where riser 100 interfaces with the rear portion of the seat frame). The direct supports (e.g., front leg 102, lower arm 106, and upper arm 108) between these three interface positions (front foot 110, front upper interface 114, and front interface through hole 118) help provide the structural strength required to withstand demanding load conditions, such as those discussed in greater detail below.

While many of the portions of riser 100 are substantially straight, the legs (102 and 104) and arms (106 and 108) are slightly tapered (e.g., thinner in the middle than at the ends). The tapering improves the visual appearance of the riser and reduces mass while maintaining the strength of the riser and allowing it to function under large loading conditions. Additionally, the interior and exterior corners and transitions are rounded (e.g., as opposed to being sharp), which also improves the aesthetics of the part and improves strength.

In addition to the structural strength provided by the configuration of riser 100, there are other beneficial aspects. For example, front leg 102, lower arm 106, and upper arm 108 substantially form inner opening 128. One advantage of inner opening 128 is that it provides access to the interior of the material that is used to produce riser 100 during an extrusion process, which is described in greater detail below. Access to the interior of the material allows coolant (e.g., water and/or air) to be applied to the interior surface of the material corresponding to inner opening 128, which allows the material to be cooled (e.g., quenched) more uniformly during the extrusion process. Uniform cooling reduces the amount of non-uniformity and/or anisotropy in the material of the finished part, which improves the strength and predictability of the performance of riser 100.

Figure 5:
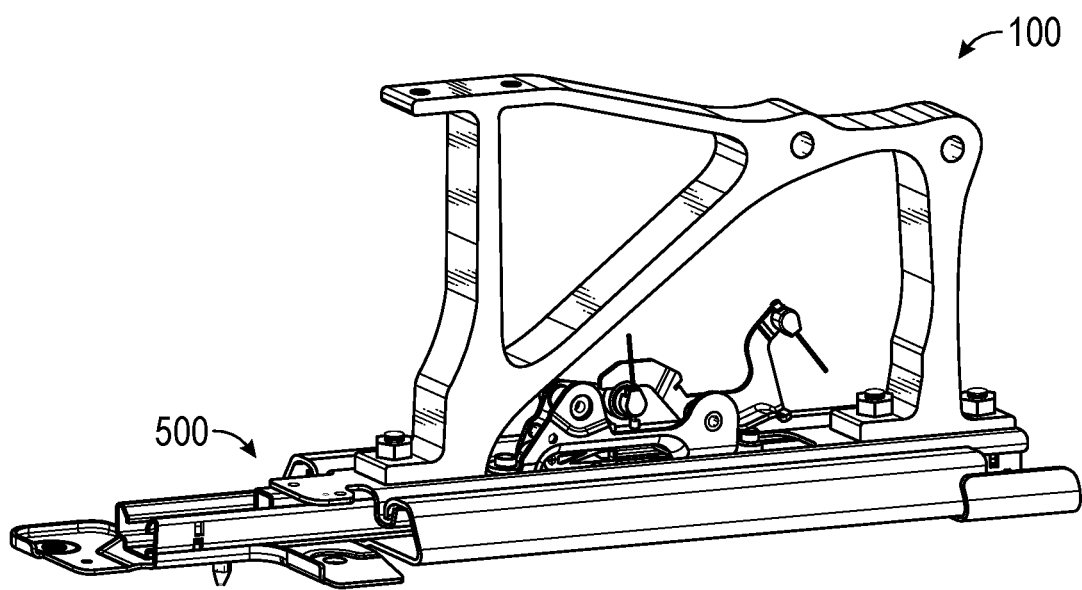
FIG. 5 illustrates a riser attached to a sliding mechanism according to some embodiments.

Additionally, lower arm 106, rear arm 116, and rear leg 104 form an arch that creates lower opening 130. One advantage of lower opening 130 is that it provides access to open space underneath the seat of the vehicle for passengers to insert and/or store objects, cargo, or the like. Another advantage of lower opening 130 is that is provides room for additional vehicle components. For example, in FIG. 5, riser 100 is connected to track assembly 500 that is configured to be attached to the vehicle floor to facilitate fore/aft movement of the seat. Lower opening 130 provides space for adjustment mechanism 504 to be placed in-line with riser 100 without occupying additional space underneath the seat that can otherwise provide space for cargo, foot room, or other vehicle equipment. Also, similar to the advantages discussed above for inner opening 128, one advantage of lower opening 130 is that it provides access to the interior of the material from which riser 100 is formed during the extrusion process. Access to the interior of the material allows coolant (e.g., water and/or air) to be applied to the portion of the material corresponding to the rear-facing surface of lower leg 106, the lower surface of rear arm 116, and the forward-facing surface of rear leg 104, which allows the material to be cooled (e.g., quenched) more uniformly during the extrusion process. As mentioned above, uniform cooling reduces the amount of non-uniformity and/or anisotropy in the material of the finished part, which improves the strength and predictability of the performance of riser 100.

It should be recognized that some portions of riser 100 are, optionally, combined, some portions are, optionally, changed, some portions are, optionally, omitted, and additional portions are optionally added. For example, some seat architectures allow portions of riser 100 to be omitted. In some embodiments, if not all seat belt anchorages are on the seat structure (e.g., at least some seat belts are anchored at least partially to the vehicle frame), the load requirements on riser 100 are substantially reduced, and one or more portions of riser 100 are omitted. In some embodiments, a track mechanism (e.g., track assembly 500 depicted in FIG. 5) is affixed to the top of riser 100 and provides support that eliminates the need for upper arm 108 and/or rear arm 116. In some embodiments, riser 100 includes upper arm 108, but does not include lower arm 106 and/or rear arm 116; in some embodiments, riser 100 includes lower arm 108, but does not include upper arm 108 and/or rear arm 116; and in some embodiments, riser 100 includes rear arm 116, but does not include lower arm 106 and/or upper arm 108. In some embodiments, front upper interface 114, front foot 110, and/or rear foot 112 is omitted (e.g., riser 100 includes one or more attachment interfaces that are collinear with front leg 102 and/or rear leg 104).

Figure 7:
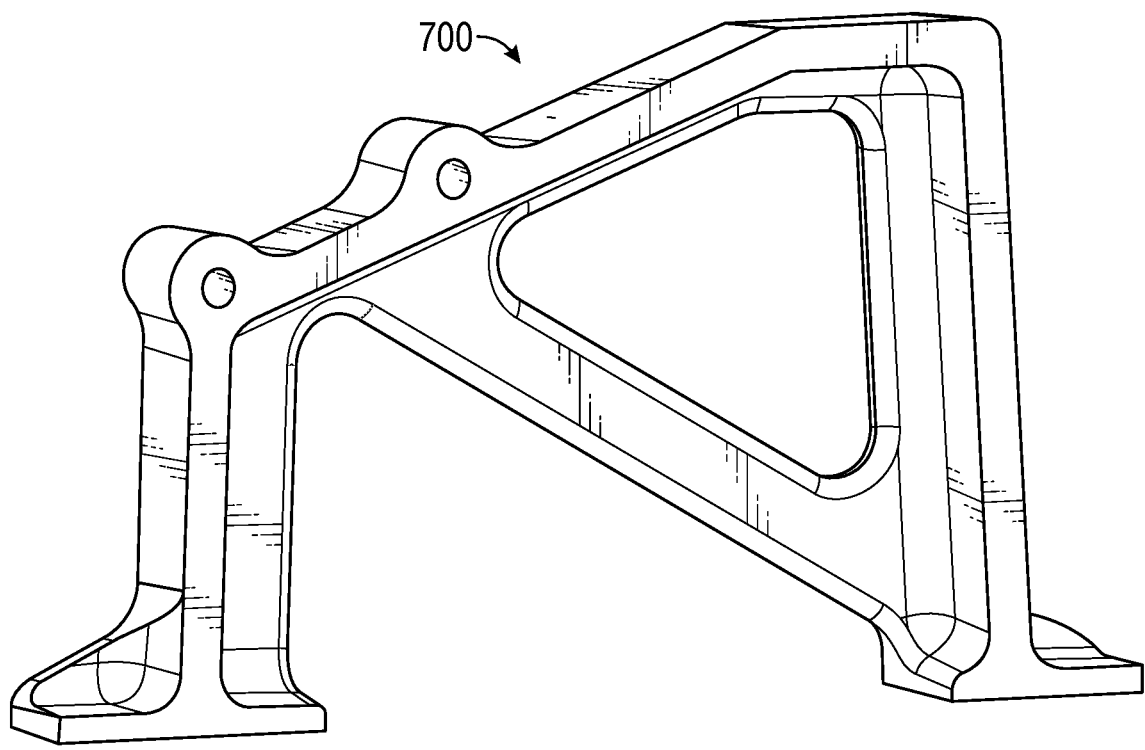
FIG. 7 illustrates a riser according to some embodiments.
Figure 8:
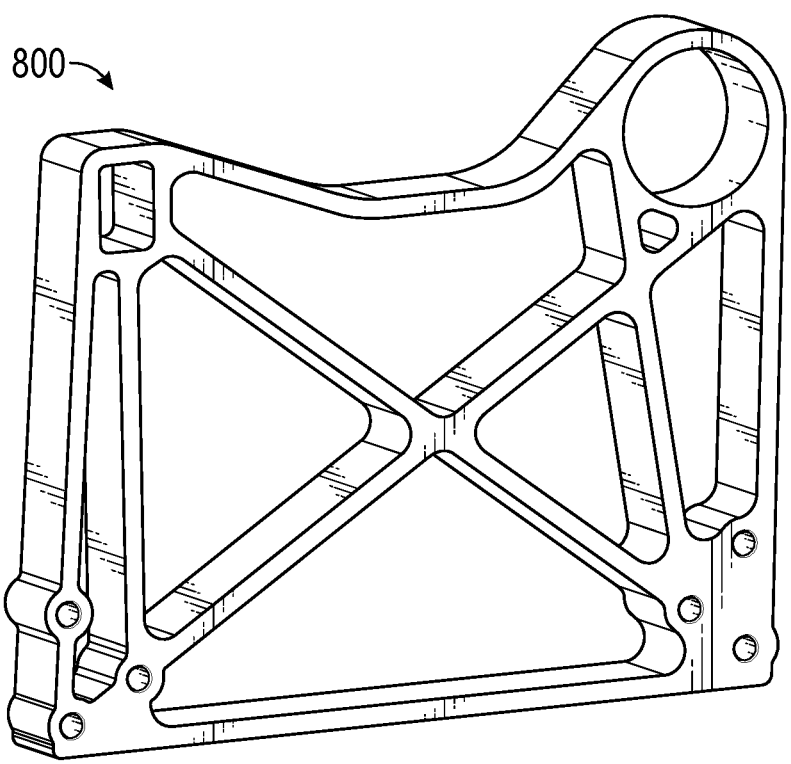
FIG. 8 illustrates a riser according to some embodiments.
Figure 9:
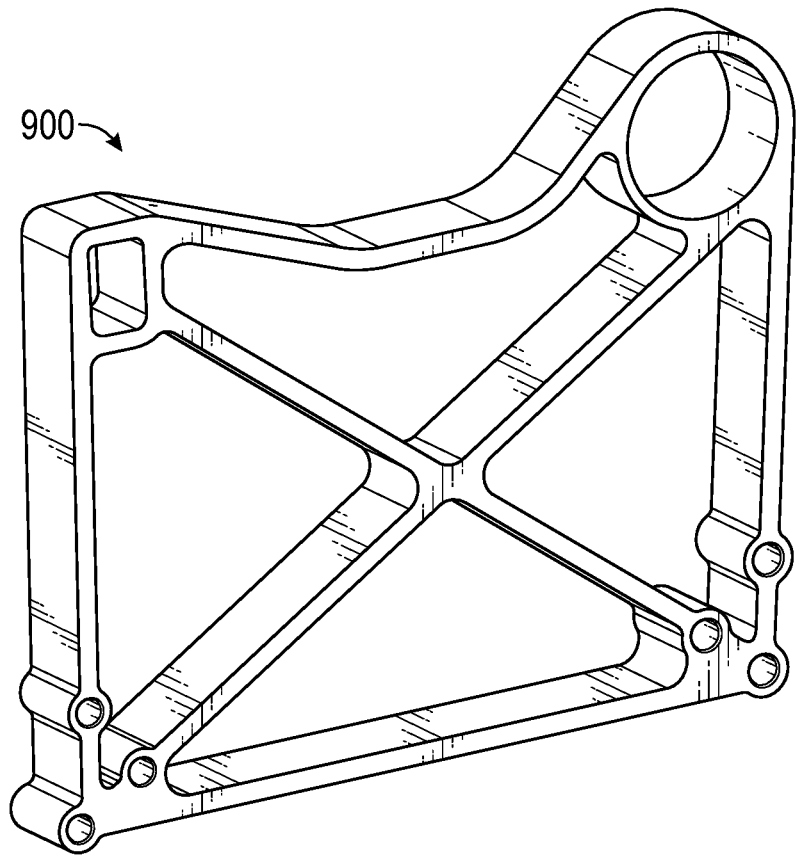
FIG. 9 illustrates a riser according to some embodiments.
Figure 10:
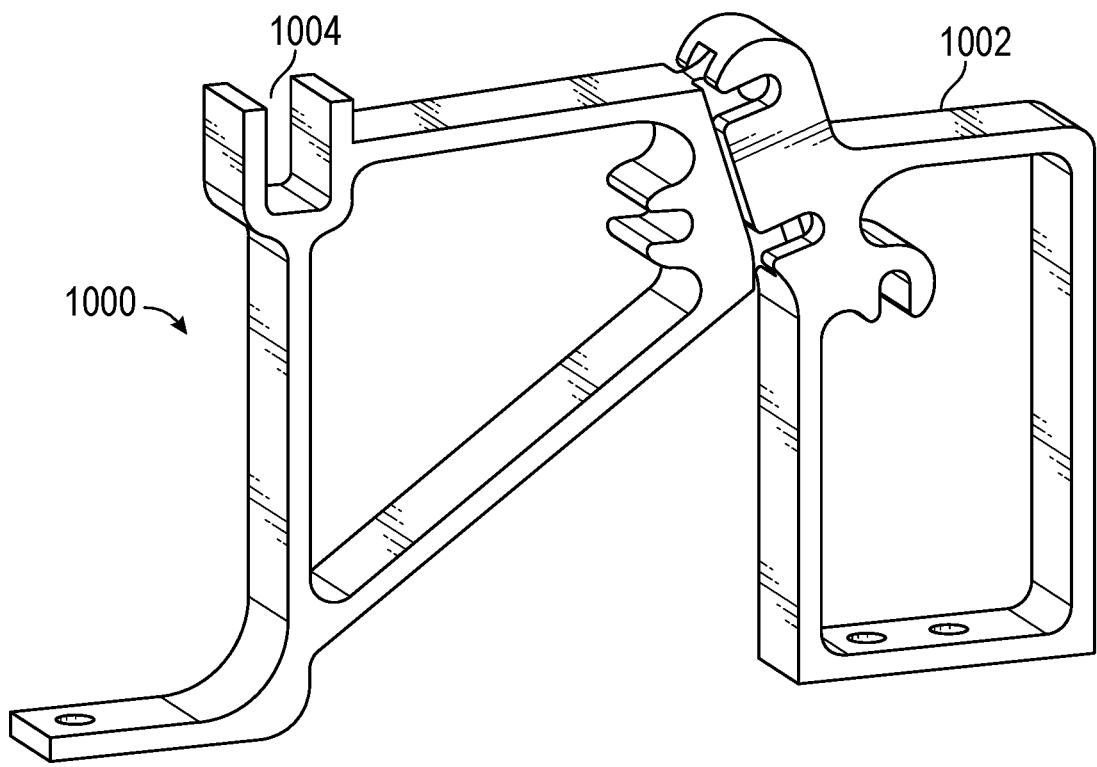
FIG. 10 illustrates a riser according to some embodiments.
Figure 11:
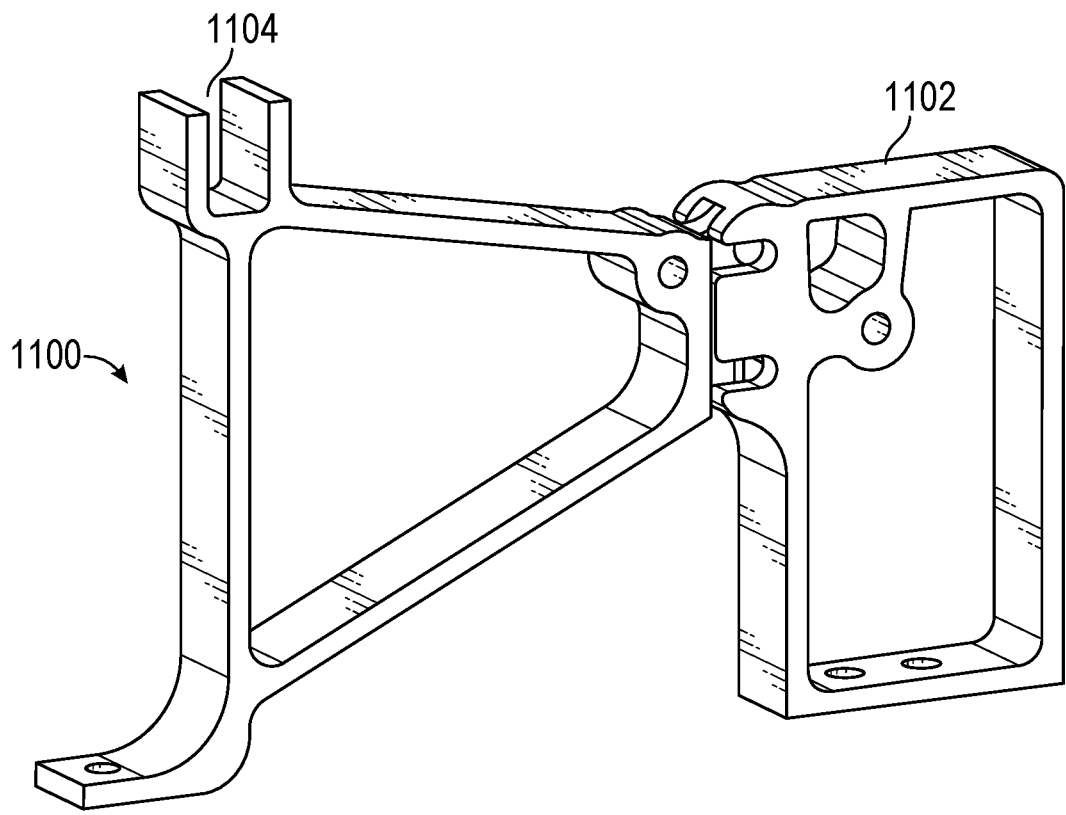
FIG. 11 illustrates a riser according to some embodiments.
Figure 12:
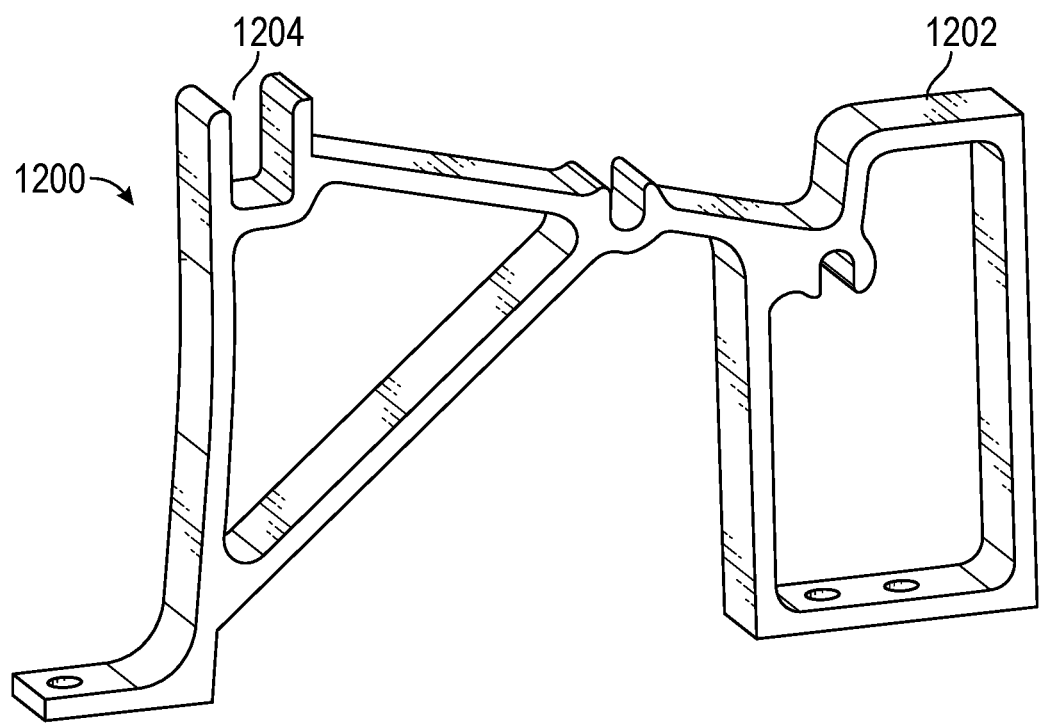
FIG. 12 illustrates a riser according to some embodiments.
Figure 13:
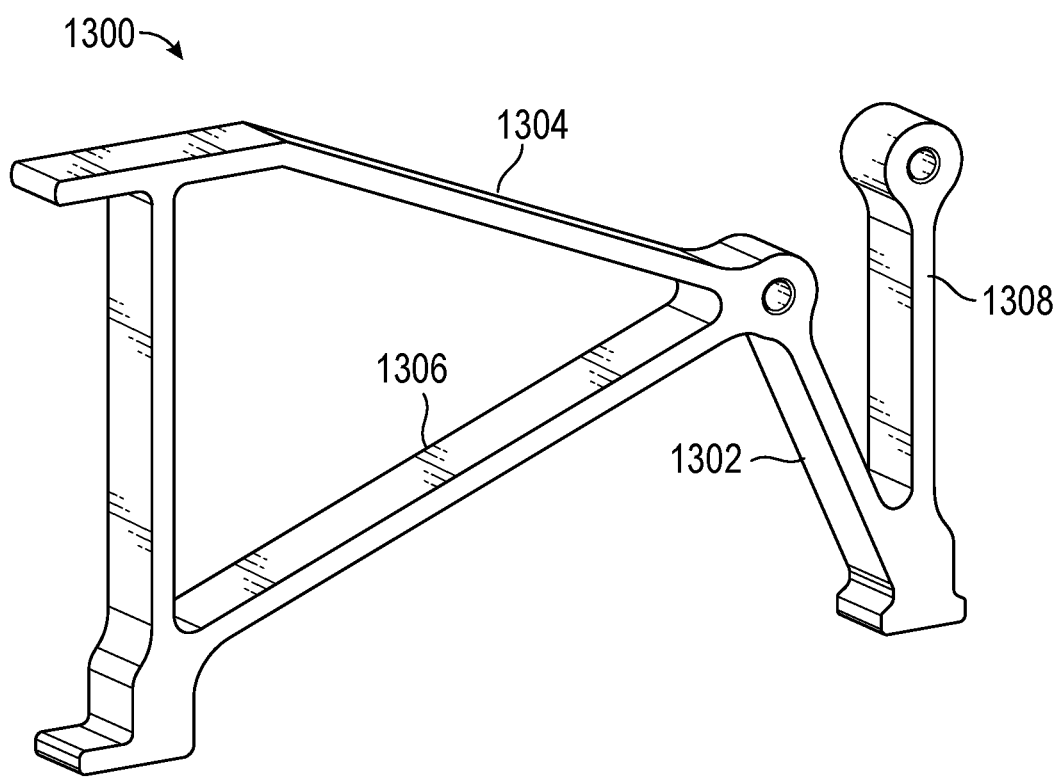
FIG. 13 illustrates a riser according to some embodiments.
Figure 14:
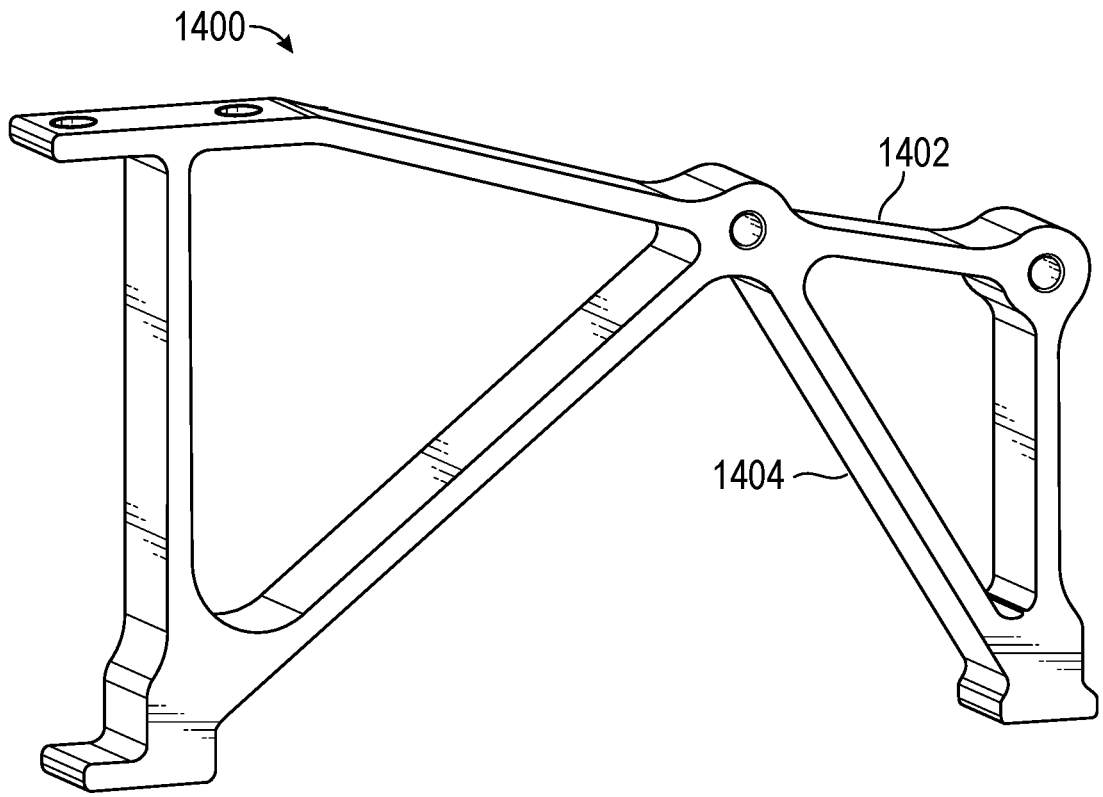
FIG. 14 illustrates a riser according to some embodiments.
Figure 15:
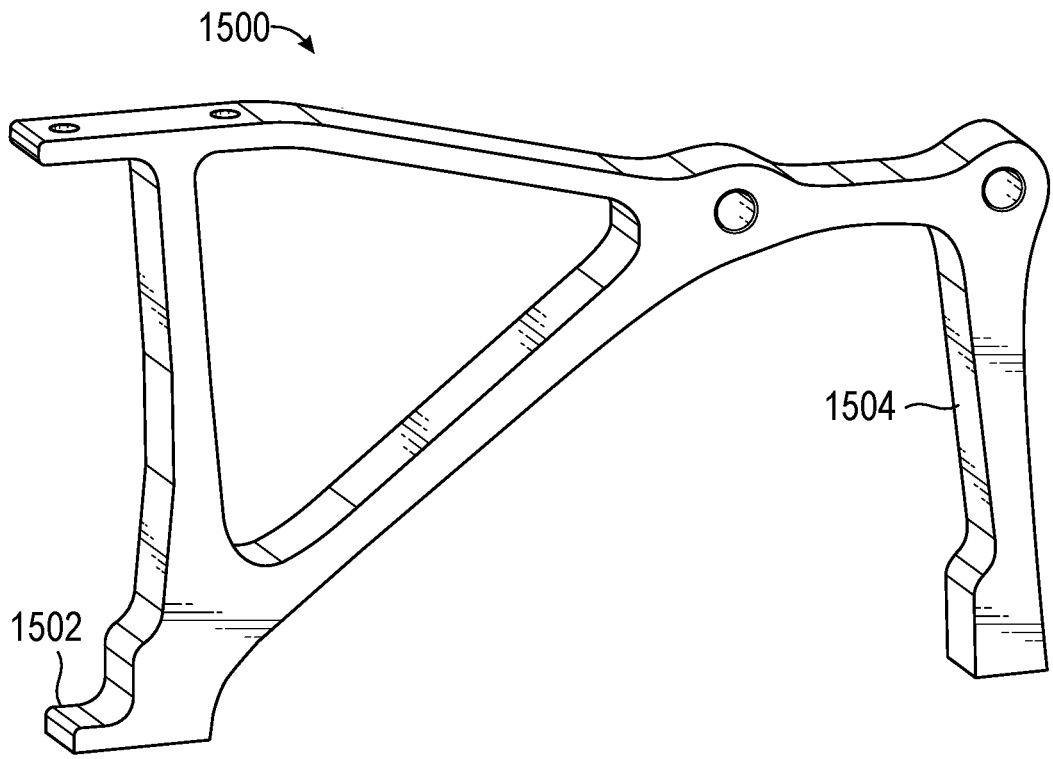
FIG. 15 illustrates a riser according to some embodiments.

Accordingly, riser 100 depicted in FIGS. 1A-1F is one exemplary embodiment. FIGS. 7-15 illustrate other exemplary embodiments. FIG. 7 illustrates an embodiment of a riser 700 that is forged. FIGS. 8-9 illustrate embodiments of risers 800 and 900, respectively, with, among other things, different interfaces for connecting to a seat and/or vehicle frame than the interfaces of riser 100 depicted in FIGS. 1A-1F. FIGS. 10-11 depict embodiments of risers 1000 and 1100, respectively, that include, among other things, two pieces, substantially rectangular rear structures 1002 and 1102 (e.g., rear leg), and U-shaped front upper interfaces 1004 and 1104. FIG. 12 depicts an embodiment of riser 1200 that includes, among other things, a U-shaped front upper interface 1204 and a substantially rectangular rear structure 1202. FIG. 13 depicts an embodiment of riser 1300 with, among other things, a rear arm 1302 extending from the rear ends of an upper arm 1304 and a lower arm 1306 to a lower end of a rear leg 1308. FIG. 14 depicts an embodiment of riser 1400 with, among other things, two rear arms, upper rear arm 1402 and lower rear arm 1404. FIG. 15 depicts an embodiment of riser 1500 that is similar to riser 100, but without a vertical through hole in front foot 1502 and without a rear foot that substantially extends from the bottom of rear leg 1504.

Turning now to FIGS. 2A and 2B, the riser described above is shown connecting an exemplary seat structure 200 to an exemplary vehicle frame 208. In a finished vehicle, the seat structure 200 is provided with cushions and decorative panels, which are omitted in FIGS. 2A-2A for clarity. FIG. 3 illustrates an embodiment of a seat with cushions and trim.

As shown in FIGS. 2A-2B, risers 100A and 100B raise seat structure 200 off the floor of a vehicle and provide an interface between the seat and the vehicle frame. Seat structure 200 includes attachment points to connect seat structure 200 to risers 100A and 100B. As illustrated in FIGS. 2A-2B, the front upper interfaces of risers 100A and 100B are connected to the bottom of seat structure 200 by bolts (e.g., through vertical through holes 126A and 126B). The front and rear legs of risers 100A and 100B are connected to frame portions 208A and 208B, respectively, by bolts (e.g., through vertical through holes 122, 124A, and 124B). Risers 100A and 100B are connected to brackets 210A and 210B, respectively, on the bottom of seat structure 200 with bolts via the respective front and rear interface through holes (e.g., 118 and 120). As can be seen in FIGS. 2A and 2B, risers 100A and 100B are located completely underneath the seat structure 200. This has the advantage that the risers do not interfere with or constrain the back portion of the seat, which allows the seat back to fold down forward and lay flat against the bottom of the seat or tilt backward for greater flexibility.

In the illustrated embodiment, seat structure 200 is configured for two passengers, and includes seat belts 206A and 206B. The lap belt portions of seat belts 206A and 206B are anchored to the seat frame and the shoulder portion is anchored to the seat back. In the illustrated embodiment, seat belt 206B is offset to the left of the middle of seat structure 200 (from the perspective of FIG. 2B).

In some embodiments, seat structure 200 is the larger portion (e.g., the 60 portion) of a 60/40 rear (e.g., second row) seat configuration of a vehicle in which the rear seat comprises two independent portions that occupy 60% and 40% of the entire width of the rear seat, respectively. In some embodiments, the 60 portion is configured to accommodate two passengers, as shown in FIGS. 2A-2B (e.g., it has two seat belts), and the 40 portion is configured to accommodate one passenger (e.g., it has one seat belt). In some embodiments, the 40 portion of the rear seat is also connected to the frame of the vehicle via two of the risers described herein, one on each side of the 40 portion. In some embodiments, the feet of risers 100A and 100B are connected to tracks or another mechanism that allows seat structure 200 to translate (e.g., forward or backward). For example, a track assembly can include a pair of seat tracks and be configured to be attached to the vehicle floor to facilitate fore/aft movement of the seat. When used for both the 60 portion and the 40 portion of the rear seat, the riser described herein allows for each portion of a second row seat to slide and/or fold down independently. Furthermore, as can be seen in FIG. 2B in particular, the risers provide open space underneath the center of the passenger seat that may be used, for example, for passenger leg and/or foot room, to store cargo, and/or for additional vehicle components.

In some embodiments, riser 100 is capable of meeting load requirements of various safety standards, thus making it feasible for use in commercial vehicles. When each of the portions of a 60/40 rear seat are supported by two risers, the 60 portion of the rear seat is more demanding on the risers from a loading perspective since the 60 portion is configured to accommodate two passengers and has a larger frame while having the same number of risers as the 40 portion, which is configured for only one passenger. FIG. 4 depicts seat structure 200 supported by risers 100A and 100B. In FIG. 4, the seat belts are fastened, and each passenger location of seat structure 200 is loaded with two blocks, a sled that engages the respective belt at the lap portion and a block that engages the respective chest portion of the belt. The blocks are pulled away from the seat as shown in FIG. 4. In some embodiments, the seat belt (e.g., the chest and/or lap end of the seat belt) is connected directly to the frame of the vehicle to transfer at least a portion of the load from the seat belt directly to the vehicle frame. In the illustrated embodiment, however, the seat belt is attached solely to the seat in what is call an "all belts to seat" design. Thus, the entire load is transferred to the vehicle frame (and more specifically, to the floor of the vehicle frame) via risers 100A and 100B, which places greater stress on the risers compared to embodiments in which the seat belt is connected to the frame of the vehicle. Although the load on the risers is more demanding, the all belts to seat design eliminates obstructions caused by attaching the seat belt to the vehicle frame. Attaching the seat belt to the frame of the vehicle interferes with a passenger's ability to move the seats, enter or exit the vehicle, or load or unload cargo.

In some embodiments, risers 100A and 100B are capable of maintaining their structural integrity and meeting the requirements of Federal Motor Vehicle Safety Standard (FMVSS) 207 and/or 210 for the seat configuration of seat structure 200, thus providing the strength needed to accommodate an all belts to seat design. FMVSS 210, for example, establishes requirements for seat belt assembly anchorages to insure their proper location for effective occupant restraint and to reduce the likelihood of their failure. The standard applies to passenger cars, multipurpose passenger vehicles (MPVs), trucks and buses for a Type 2 seat belt assembly (combination lap and shoulder belts), like the assembly depicted in FIGS. 2A-2B and FIG. 4. According to this standard, each block in FIG. 4 is loaded with 13.5 kN force, and a horizontal center of gravity load of 20 g times the mass of the seat is applied to each seat. This results in a total force in excess of 90 kN. The load is applied statically and held for 10 seconds. The loading is similar loading to three times a 95th percentile occupant in a frontal crash. In some embodiments, risers 200A and 200B are capable of maintaining structural stability during a simulated rear crash load equivalent to the seat being loaded with a mass of three times a 95th percentile occupant while being subjected to a force equivalent to an acceleration pulse equivalent to getting hit from behind at 50 miles per hour. In some embodiments, the risers are capable of meeting both the frontal and rear crash loads to provide a strong and safe seat during either type of impact.

One advantage of riser 100 is that it can be manufactured using an extrusion process. Extrusion is the process of forcing material (e.g., aluminum or aluminum alloy) to flow through a shaped opening in a die. This results in an elongated piece of material with the same profile as the shaped opening.

In some embodiments, the material (e.g., Al) is heated (e.g., to substantially 800-925 degrees Fahrenheit) so that it is soft but still solid, and then transferred to a cradle that holds the heated material. A ram pushes the heated material through the die. The die may be cooled (e.g., by flowing liquid nitrogen or nitrogen gas around sections of the die). The temperature of the extruded material is optionally monitored as the extrusion exits the die. The target exit temperature depends upon the alloy. For example, the target minimum exit temperature for the alloys 6063, 6463, 6063A, and 6101 is substantially 930° F. The target minimum exit temperature for the alloys 6005A and 6061 is substantially 950° F. For 6000 series alloys, die exit temperatures around 930-980° F. may result in optimum mechanical properties.

The extruded material is pulled to guide the material as it is pushed out of the die. The extrusion is cooled (e.g., quenched) as it is being pulled. Various cooling techniques may be used. For example, the material may be cooled by a series of fans along the length of extrusion. The extrusion for some materials (e.g., alloy 6061) may be water quenched and/or air quenched. After the material has cooled, it is stretched to straighten the extrusion and re-aligns the molecules of the material. Re-alignment increases the hardness and improves the strength of the material.

Next, the extrusion is cut into sections (e.g., into sections having the width shown in FIGS. 1C-1F). Laser cutting is one exemplary cutting technique. After cutting, through holes (e.g., 118, 120, 122, 124A, 124B, 126A, and 126B) are drilled. Optionally, the sections are heat treated, tumble polished, machines around the perimeter to improve haptics and prevent dents, and/or powder coated (e.g., with black organic powder coat to harmonize with adjacent components).

Many factors affect the extrusion process, including shape, size (e.g., lateral extent), and material (e.g., alloy) of the parts being extruded. There are various features of riser 100 that allow it to be manufactured using the extrusion process and which improve the extrusion process to enhance the characteristics (e.g., strength, uniformity, etc.) of the finished riser.

For example, riser 100 is comprised of an extrudable material. In some embodiments, riser 100 is comprised of an aluminum alloy, such as 6005A-T61, 6063, or 6061. Optionally, the aluminum alloy includes silicon manganese. In some embodiments, the material is highly thermally conductive (e.g., to remove heat during quenching) and/or has limited anisotropic characteristics.

Another characteristic of riser 100 that improves the extrusion process is that there is little variation in thickness of the portions of riser 100. For instance, front leg 102, rear leg 104, lower arm 106, and upper arm 108 all have a similar thickness, and the thickness of each does not vary considerably along the length of the respective portion. This makes it easier to control the temperature of the material as it is being extruded. Temperature is an important factor throughout the extrusion process, as the temperature determines important characteristics of the extruded material, such as hardness and finish. Reducing the variation in thickness of the portions of the riser allows a more uniform temperature to be maintained throughout the material during the extrusion process (e.g., at a point in time, the temperature of a portion of the material does not vary significantly from the temperature of any other portion). In contrast, an extrusion that has large variations in thickness will have a significantly different temperature near the center of a thick portion compared to the temperature at the surface of the portion or near the center of a thinner portion (e.g., thicker portions take longer to cool, while thinner portions cool faster). Failure to properly control the temperature of the material during extrusion can cause the material to become brittle and break. Thus, the riser 100 allows the temperature of the material to be more accurately controlled during extrusion. Non-uniform cooling can also cause inconsistencies in the material. The thin portions also reduce effects of anisotropic properties caused by the extrusion process.

Yet another characteristic of riser 100 that improves the extrusion process is that inner opening 128 and lower opening 130 provide access to the inner portion of the material and to more surface area of the extrusion during the extrusion process. For example, the portion of the extrusion corresponding to front leg 102 can be cooled from both the front surface shown in FIG. 1D and the surface facing inner opening 128. This too provides for better control of the temperature of the material during the extrusion process, which allows for less variation in temperature across each portion. As described above, access to the interior of the extrusion allows coolant (e.g., water and/or air) to be applied to the interior surface of the portion of the extrusion corresponding to inner opening 128, which enables the material to be cooled (e.g., quenched) more uniformly during the extrusion process. Uniform cooling reduces the amount of non-uniformity and/or anisotropy in the material of the finished part, which improves the strength and predictability of the performance of riser 100. Similarly, lower opening 130 also provides access to the interior of the material and to more surface area during the extrusion process. Lower opening 130 allows coolant (e.g., water and/or air) to be applied to the portions of the extrusion corresponding to the rear-facing surface of lower leg 106, the lower surface of rear arm 116, and the forward-facing surface of rear leg 104, which enables the material to be cooled (e.g., quenched) more uniformly during the extrusion process.

In addition to the features of the riser that improve the extrusion process, the extrusion process itself has various advantages. For instance, the extrusion process allows riser 100 to be formed from a single piece of material (e.g., aluminum alloy), which improves its strength over brackets or risers that consist of several pieces that are subsequently connected, creating joints, seams, or other connections that introduce weak spots and points of potential failure.

Figure 6:
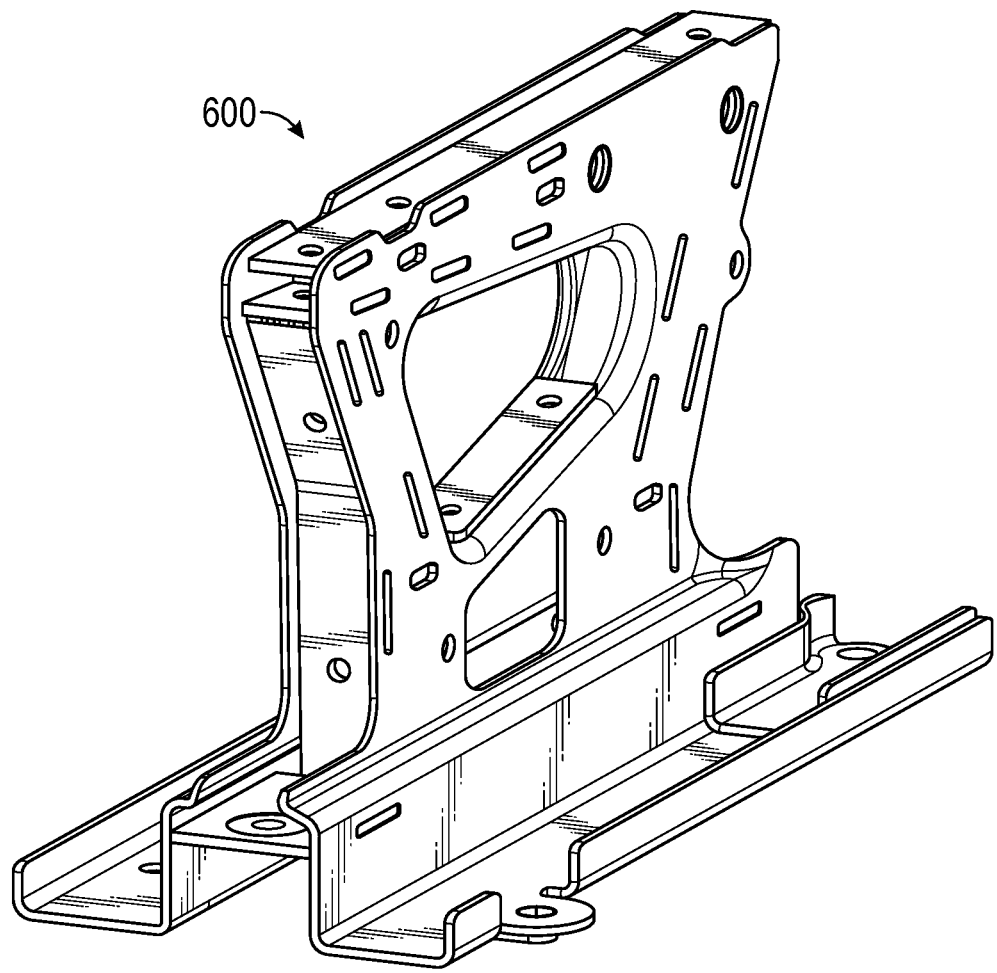
FIG. 6 illustrates a multi-part riser.

The extrusion process is also more efficient than other processes that require forging, stamping, and/or casting. For example, FIG. 6 illustrates a steel riser 600 that includes twelve parts and requires substantially thirty-five welds to manufacture. The parts of riser 600 are stamped or forged and then welded together. This makes production of riser 600 considerably more time consuming, labor intensive, and costly than production of riser 100. Riser 600 also weighs substantially 6.164 kg, which is about 4.3 kg more than riser 100 when formed from aluminum alloy. For a vehicle that includes four risers, using riser 100 instead of riser 600 reduces mass by 17.2 kg, requires 44 fewer parts, and does not require any welds. Less mass can result in better vehicle performance, allow for additional features to be added to the vehicle, or allow for weight budget to be allocated to other vehicle components. Riser 600 also does not have an opening similar to lower opening 130 of riser 100, which provides the various space advantages described above.

Also, since riser 100 is obtained by cutting a section of the extrusion, the extrusion process provides greater options and flexibility for the thickness of the riser (e.g., the thickness of the riser in the z-direction in FIGS. 1A-1F). In particular, extrusion allows for the riser to have a greater thickness (while only comprising a single piece) than would be possible with other manufacturing methods. The thickness, and the strength, of riser 100 can be increased simply by cutting a larger section of the extruded material. In contrast, medium to high strength steel, for example, may be stamped to create 3.5 mm thick cross sections. Several stamped cross-sections would then need to be adhered (e.g., welded) together to achieve the thickness of riser 100.

In some embodiments, a riser (e.g., 100) for a seat of a vehicle includes a first leg (e.g., front leg 102) that includes a first end (e.g., upper end) and a second end (e.g., lower end); a second leg (e.g., rear leg 104) substantially parallel to the first leg, the second leg including a first end (e.g., upper end) and a second end (e.g., lower end); a first arm (e.g., upper arm 108) extending from the first end (e.g., top end) of the first leg; a second arm (e.g., lower arm 106) extending from the second end (e.g., lower end) of the first leg; and a third arm (e.g., rear arm 116) including a first end (e.g., front end) and a second end (e.g., rear end), where the second end of the third arm extends from the first end (e.g., upper end) of the second leg, the first arm extends from the first end of the first leg to the first end of the third arm and the second arm extends from the second end of the first leg to the first end of the third arm. In some embodiments, the first leg, second leg, first arm, second arm, and third arm are in the same plane. In some embodiments, a first foot (e.g., front foot 110) is connected to the second end (e.g., lower end) of the first leg, where the first foot is substantially perpendicular to the first leg and extends away (e.g., forward) from the second leg. In some embodiments, a second foot (e.g., rear foot 112) is connected to the second end (e.g., lower end) of the second leg, where the second foot is substantially perpendicular to the second leg and extends from the second end of the second leg toward the first leg and from the second end of the second leg away from the first leg. In some embodiments, the third arm is substantially perpendicular to the second leg. In some embodiments, a first interface (e.g., front upper interface 114) is connected to the first end (e.g., upper end) of the first leg, where the first interface is substantially perpendicular to the first leg and extends away (e.g., forward) from the second leg. In some embodiments, the riser includes a first interface through hole (e.g., front interface through hole 118) and a second interface through hole (e.g., rear interface through hole 120), where the first interface through hole is adjacent to the second end (e.g., rear end) of the second arm and the second interface through hole is adjacent to the first end (e.g., upper end) of the second leg, where the first interface through hole and the second interface through hole each has an axis that is perpendicular to the first leg and perpendicular to the third arm (e.g., the axis is parallel to the z-axis). In some embodiments, the direction from the first end of the first leg to the second end of the first leg is the same as the direction from the first end of the second leg to the second end of the second leg. In some embodiments, a line between the first interface through hole and the second interface through hole is substantially parallel to a line between the first foot and the second foot (e.g., the first interface through hole and the second interface through hole are approximately the same height in the y-direction). In some embodiments, the first leg is longer than the second leg. In some embodiments, the first leg (e.g., front leg 102), the first arm (e.g., upper arm 108), and the second arm (e.g., lower arm 106) substantially form an interior opening (e.g., opening 128). In some embodiments, the second arm (e.g., lower arm 106), the third arm (e.g., rear arm 116), and the second leg (e.g., rear leg 104) form an arch (e.g., opening 130). In some embodiments, the riser is a cross-section of an extruded piece of aluminum alloy.

In some embodiments, a structure (e.g., riser 100) includes: a first support (e.g., front leg 102); a second support (e.g., lower arm 106) extending from the first support, where the second support extends at least partially in a direction perpendicular to the first support (e.g., the x-direction); a first interface (e.g., front upper interface 114, front foot 110, front interface through hole 118, rear interface through hole 120, or rear foot 112) configured to connect the structure to a first external structure (e.g., seat structure 200); and a second interface (e.g., front upper interface 114, front foot 110, front interface through hole 118, rear interface through hole 120, or rear foot 112) configured to connect the structure to a second external structure (e.g., vehicle frame 208). In some embodiments, the structure includes a third support (e.g., upper arm 108) extending from the first support, where the third support extends at least partially in a direction perpendicular to the first support (e.g., the x-direction). In some embodiments, the third support is substantially perpendicular to the first support. In some embodiments, the first support, the second support, and the third support substantially form an interior opening (e.g., 128). In some embodiments, the structure includes a fourth support (e.g., rear leg 104) substantially parallel to the first support, and a fifth support (e.g., rear arm 116) extending between the third support and the fourth support. In some embodiments, the fifth support is substantially perpendicular to the fourth support. In some embodiments, the first interface or the second interface includes a through hole (e.g., front interface through hole 118 or rear interface through hole 120). In some embodiments, the structure is a cross-section of an extruded piece of aluminum alloy.

The foregoing disclosure is not intended to limit the present disclosure to the precise forms or particular fields of use disclosed. As such, it is contemplated that various alternative embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the riser structure. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Additionally, numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

What is claimed is:

1. A riser for a seat of a vehicle, the riser comprising:
   a first leg having a first end and a second end;
   a second leg substantially parallel to the first leg, the second leg including a first end and a second end;
   a first arm extending from the first end of the first leg;
   a second arm extending from the second end of the first leg;
   a third arm including a first end and a second end, the second end of the third arm extending from the first end of the second leg, wherein the first arm extends from the first end of the first leg to the first end of the third arm and the second arm extends from the second end of the first leg to the first end of the third arm; and
   a first foot connected to the second end of the first leg, wherein the first foot is substantially perpendicular to the first leg and extends from the second end of the first leg away from the second leg past the first leg;
   a second foot connected to the second end of the second leg, wherein the second foot is substantially perpendicular to the second leg, and wherein the second foot extends from the second end of the second leg toward the first leg and from the second end of the second leg away from the first leg;
   and wherein the riser is a single unitary piece formed from a single piece of material.

2. The riser of claim 1, wherein the first leg, second leg, first arm, second arm, and third arm are in a same plane.

3. The riser of claim 1, wherein the third arm is substantially perpendicular to the second leg.

4. The riser of claim 1, further comprising:
   a first interface connected to the first end of the first leg, wherein the first interface is substantially perpendicular to the first leg and extends away from the second leg past the first leg.

5. The riser of claim 4, wherein the single unitary piece comprises the first interface.

6. The riser of claim 1, further comprising:
a first interface through hole; and
a second interface through hole,
wherein the first interface through hole is adjacent to the first end of the third arm and the second interface through hole is adjacent to the first end of the second leg, wherein the first interface through hole and the second interface through hole each has a central axis that is perpendicular to the first leg and perpendicular to the third arm.

7. The riser of claim 6, wherein the single unitary piece comprises the first interface through hole.

8. The riser of claim 6, wherein the single unitary piece comprises the second interface through hole.

9. The riser of claim 1, wherein the direction from the first end of the first leg to the second end of the first leg is the same as the direction from the first end of the second leg to the second end of the second leg.

10. The riser of claim 1, wherein the first leg is longer than the second leg.

11. The riser of claim 1, wherein the first leg, the first arm, and the second arm substantially form an interior opening.

12. The riser of claim 1, wherein the second arm, the third arm, and the second leg form an arch.

13. The riser of claim 1, wherein the riser is a cross-section of an extruded piece of aluminum alloy.

14. The riser of claim 1, wherein the riser is comprised of aluminum alloy.

15. The riser of claim 14, wherein the aluminum alloy is aluminum alloy 6005A.

16. The riser of claim 1, wherein the riser is formed from a forging or stamping process.

17. The riser of claim 1, wherein the riser is formed from an extrusion process.

* * * * *